United States Patent [19]

Watanabe et al.

[11] Patent Number: 5,475,436
[45] Date of Patent: Dec. 12, 1995

[54] SAMPLING RATE CONVERTING SYSTEM FOR CONVERTING THE SAMPLING RATE OF A VIDEO SIGNAL

[75] Inventors: Kazuo Watanabe; Toshio Sarugaku, both of Chiba; Hirofumi Todo, Tokyo; Masaharu Tokuhara, Kanagawa, all of Japan

[73] Assignee: Sony Corporation, Tokyo, Japan

[21] Appl. No.: 302,033

[22] Filed: Sep. 9, 1994

[30] Foreign Application Priority Data

Sep. 16, 1993  [JP]  Japan .................... 5-253808

[51] Int. Cl.$^6$ ............................................. H04N 7/01
[52] U.S. Cl. ............................ 348/441; 348/565; 348/555
[58] Field of Search .............................. 348/441, 555, 348/558, 565, 706, 571, 572, 557; H04N 7/01

[56] References Cited

U.S. PATENT DOCUMENTS

| | | | |
|---|---|---|---|
| 5,111,160 | 5/1992 | Hershberger | 348/558 |
| 5,200,749 | 4/1993 | Crosby et al. | 348/441 |
| 5,325,131 | 6/1994 | Penney | 348/706 |
| 5,339,111 | 8/1994 | Park | 348/555 |
| 5,341,178 | 8/1994 | Ebihara et al. | 348/441 |
| 5,347,318 | 9/1994 | Kobayashi et al. | 348/558 |
| 5,389,974 | 2/1995 | Bae | 348/558 |

*Primary Examiner*—Victor R. Kostak
*Attorney, Agent, or Firm*—William S. Frommer; Alvin Sinderbrand

[57]  ABSTRACT

A plurality of circuit blocks that output digital signals with different sampling frequencies are connected to data buses in common. One of outputs of the circuit blocks is selected and the output is sent to a sampling rate converter circuit block through the data buses. Each of the circuit blocks has a tri-state buffer at its output stage. With an output enable signal, a desired circuit block can be selected.

8 Claims, 7 Drawing Sheets

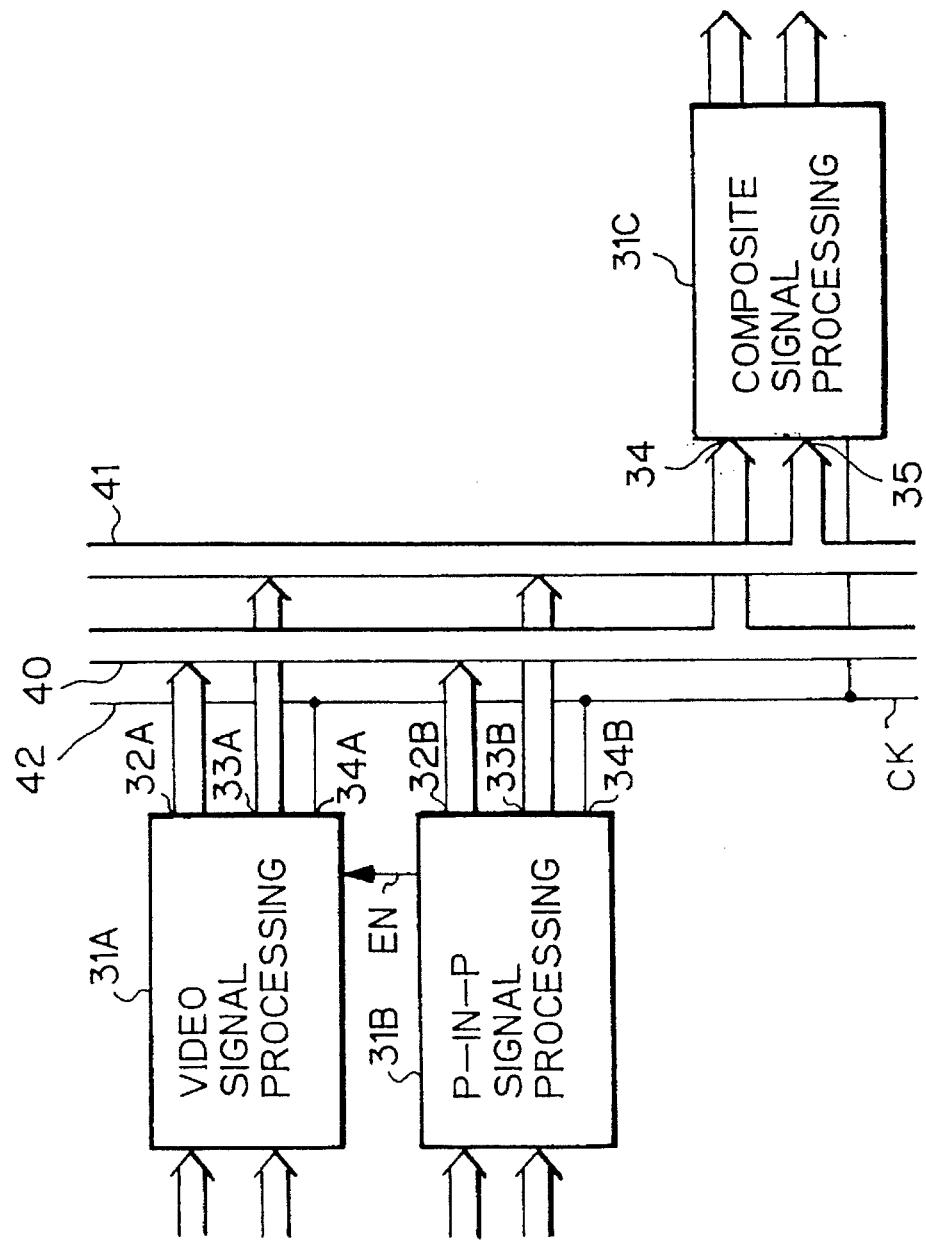

SAMPLING RATE CONVERTING SYSTEM FOR CONVERTING THE SAMPLING RATE OF A VIDEO SIGNAL

BACKGROUND OF THE INVENTION

1. Field of the Invention

The present invention relates to a sampling rate converting system for converting a sampling rate of a video signal.

When a video signal is digitized and processed, a sampling frequency suitable for the TV system of the video signal should be used. For example, the NTSC system uses a sampling frequency of 4 fsc (=14.31818 MHz). The PAL system uses a sampling frequency of 4 fsc (=17.734475 MHz). The D2-MAC system usually uses a sampling frequency of 13.5 MHz. A down-converter of the MUSE-NTSC system uses a sampling frequency of 910 fH (=14.3325 MHz).

Thus, when a video signal processing system that can deal with video signals of various TV systems such as a worldwide type TV receiver, a large number of clock frequencies should be used.

Thus, such a video signal processing system converts a digital video signal into an analog video signal and then processes the analog video signal. Alternatively, the system converts a digital video signal into an analog video signal and then process the analog signal with a common sampling clock changed from the original sampling clock.

However, when an analog signal that has been converted from a digital signal is processed, many D/A converters and low-pass filters are required, thereby increasing the circuit scale. In addition, when a signal passes through many D/A converters and A/D converters, it tends to be deteriorated.

OBJECTS AND SUMMARY OF THE INVENTION

Therefore, an object of the present invention is to provide a sampling rate converting system that can convert different sampling frequencies of signals of a plurality of circuits into a common sampling frequency without an increase of circuit scale.

Another object of the present invention is to provide a sampling rate converting system that can be easily extended.

The present invention is a sampling rate converting system, comprising a plurality of circuit blocks for outputting digital signals with different sampling frequencies, a data bus for commonly connecting output ends of the circuit blocks, and a sampling rate converter having an input end connected to the data bus and being adapted for converting a sampling frequency of a digital signal received through the data bus into a predetermined sampling frequency, wherein the system is adapted for selecting one of outputs of the circuit blocks, sending the selected output to the sampling rate converter through the data bus, and converting a sampling frequency of the selected output into the predetermined sampling frequency.

Each of the circuit blocks is connected to common buses (that are luminance signal bus and chroma signal bus). In addition, a common clock line for transmitting a clock is provided. Thus, the output of a desired circuit block can be sent to a sampling rate converter through the common buses. The clock is sent through the common clock line. The sampling rate converter can easily convert the output data of each circuit block to the common sampling rate with the clock being received. Thus, the sampling rate converter can deal with the outputs of a plurality of circuit blocks by itself. Each of the circuit blocks has a tri-state buffer at its output stage. In such a construction, with only an output enable signal that is supplied to a desired circuit block, this circuit block can be selected.

The above, and other, objects, features and advantage of the present invention will become readily apparent from the following detailed description thereof which is to be read in connection with the accompanying drawings.

BRIEF DESCRIPTION OF THE DRAWINGS

FIG. 7 is a block diagram showing a picture-in-picture circuit using buses.

DETAILED DESCRIPTION OF THE PREFERRED EMBODIMENTS

Figure 1:
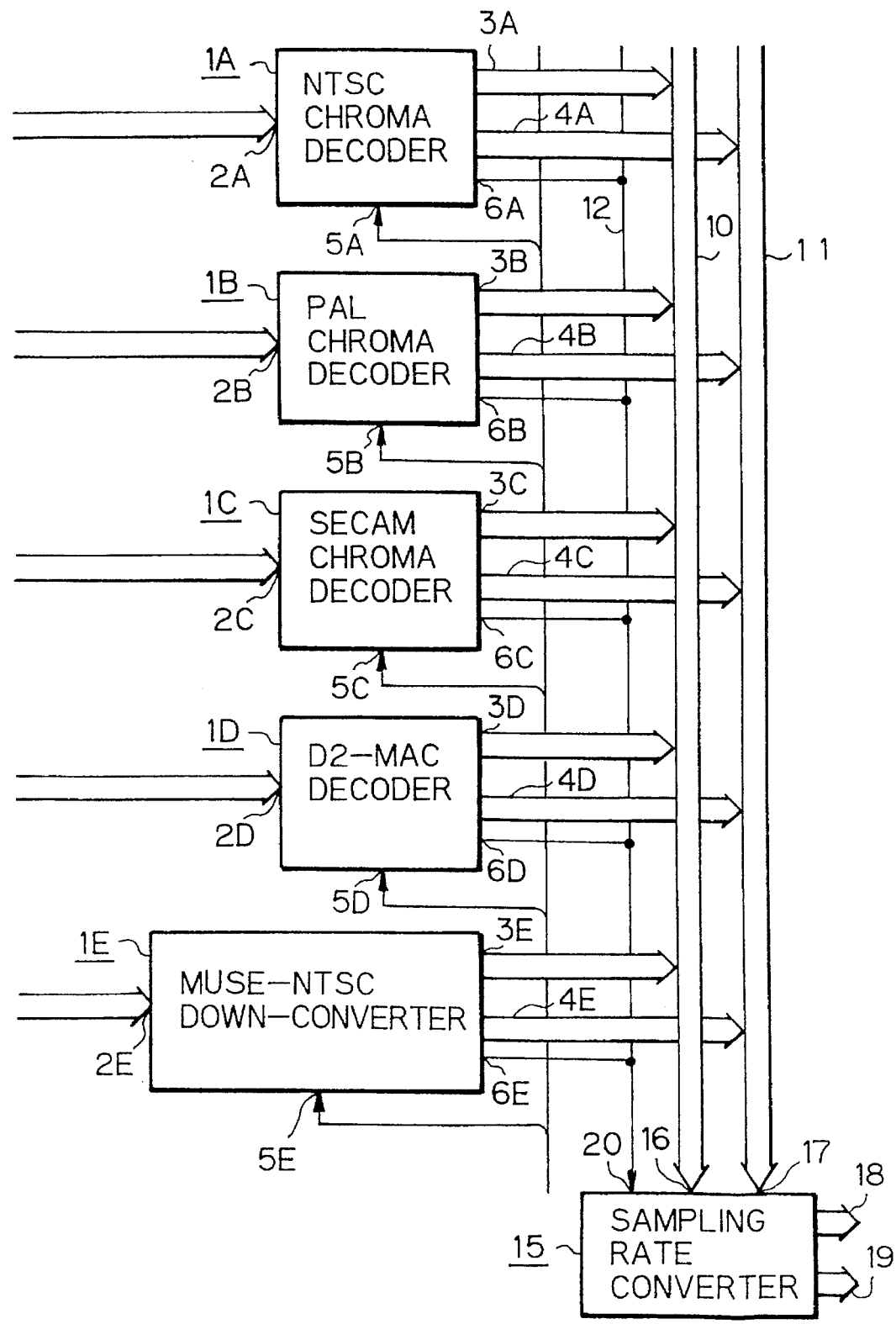
FIG. 1 is a block diagram according to an embodiment of the present invention.

Next, with reference to the accompanying drawings, an embodiment of the present invention will be described. FIG. 1 shows an embodiment of the present invention. The embodiment of the present invention is adapted for transmitting a plurality of digital video signals with different sampling frequencies on common buses. With such common buses, the outputs of circuit blocks with different sampling frequencies can be easily converted into a common sampling frequency.

In FIG. 1, reference numerals 1A to 1E are circuit blocks that operate with different sampling frequencies. In other words, the circuit block 1A is an NTSC chroma decoder. The circuit block 1B is a PAL chroma decoder. The circuit block 1C is a SECAM chroma decoder. The circuit block 1D is a D2-MAC decoder. The circuit block 1E is a MUSE-NTSC decoder.

Figure 2:
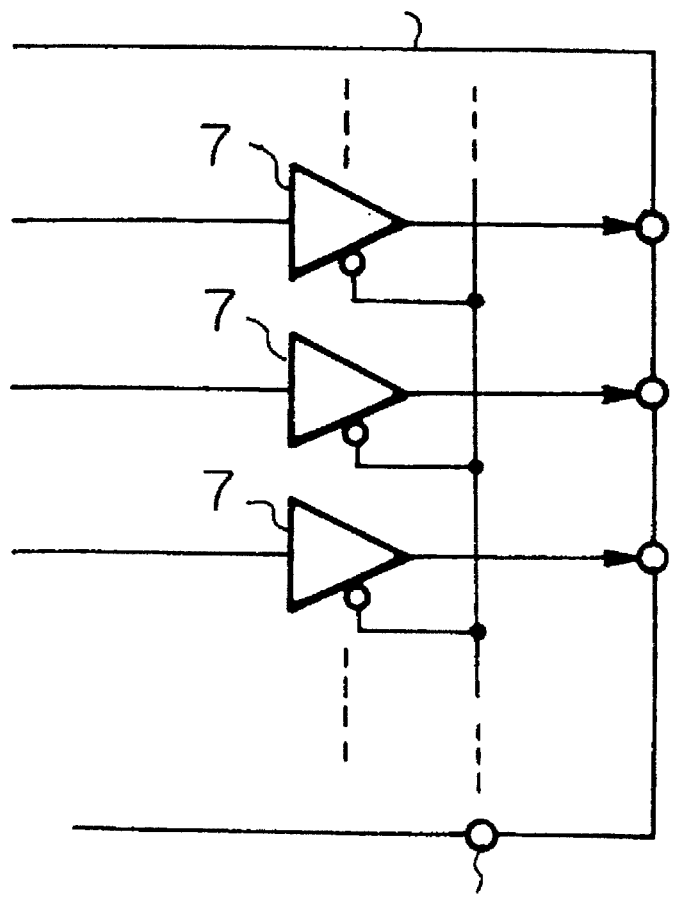
FIG. 2 is a block diagram for explaining an output stage of the embodiment of the present invention.

The circuit blocks 1A to 1E have composite digital video signal input terminals 2A to 2E, digital luminance signal output terminals 3A to 3E, and digital chroma signal output terminal 4A to 4E, respectively. The digital chroma signal output terminals 4A to 4E multiplex digital color difference signals R-Y and B-Y corresponding to the time division multiplexing technique. In other words, since the frequency band of the color difference signals R-Y and B-Y is the half the frequency band of the luminance signal, the color difference signals R-Y and B-Y are transmitted one after the other. In addition, output enable signal input terminals 5A to 5E and clock output terminals 6A to 6E are provided. As shown in FIG. 2, the circuit blocks 1A to 1E have tri-state buffers 7, 7, 7, . . . at their output stages. An output enable signal is supplied from the output enable signal input terminals 5A to 5E. The output enable signal controls the tri-state buffers 7, 7, 7, . . . The tri-state buffers 7, 7, 7, . . . become active and high-impedance state when for example the output enable signal is "L" and "H", respectively.

Figure 3:
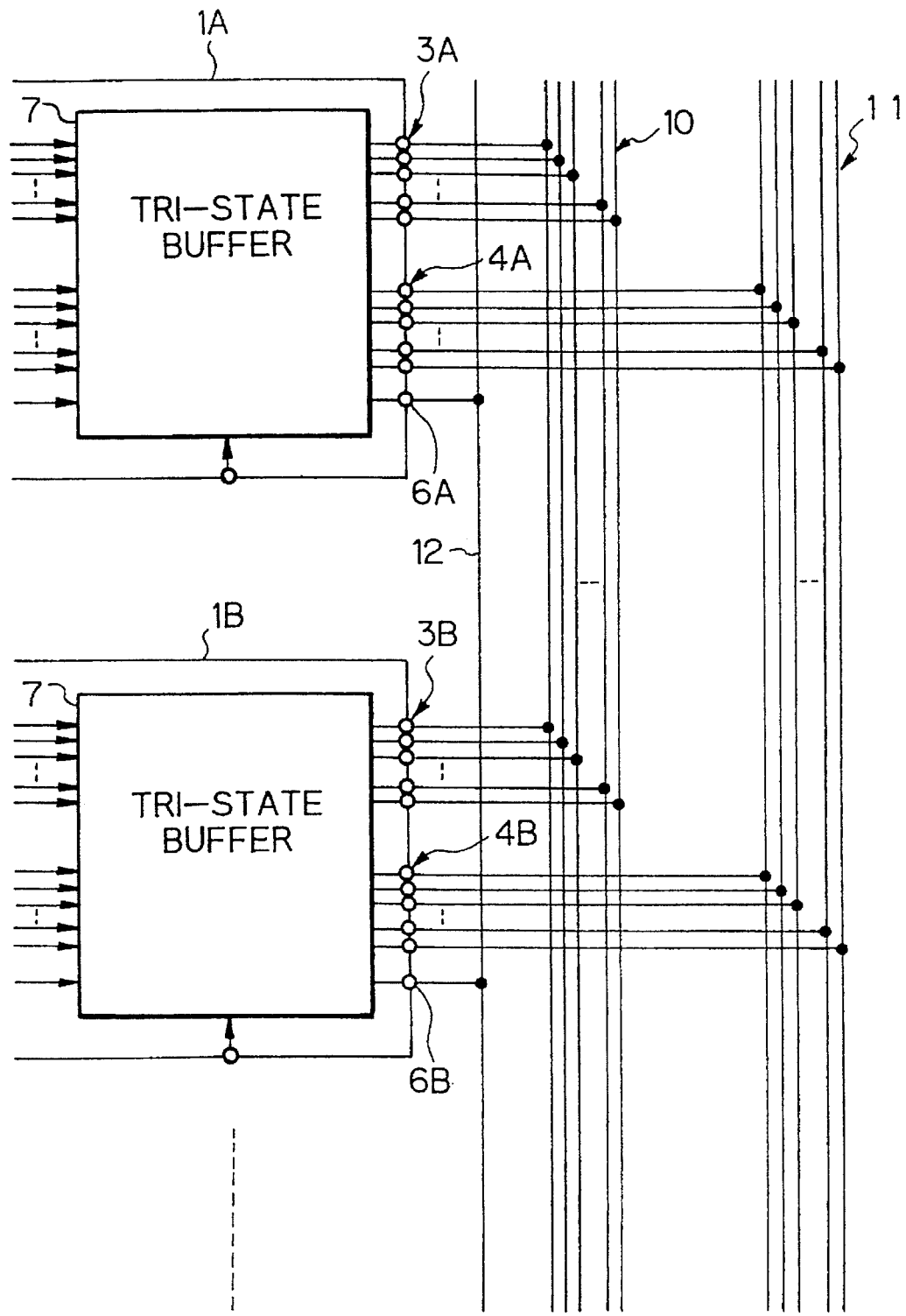
FIG. 3 is a block diagram for explaining the embodiment of the present invention.

In FIG. 1, reference numerals 10 is a luminance signal bus. Reference numeral 11 is a chroma signal bus. The luminance signal output terminals 3A to 3E of the circuit blocks 1A to 1E are connected to the luminance signal bus 10 in common. The output terminals 4A to 4E of the circuit blocks 1A to 1E are connected to the chroma signal bus 11 in common. In other words, as shown in FIG. 3, the corresponding bits of the luminance signal output terminals 3A to 3E of the circuit blocks 1A to 1E are connected to each other through the luminance signal bus 10 in such a manner that the MSB and LSB of one output terminal are connected to those of the other output terminals. Likewise, the corresponding bits of the chroma signal output terminals 4A to 4E of the circuit blocks 1A to 1E are connected to each other through the chroma signal bus 11. The clock output terminals 6A to 6E of the circuit blocks 1A to 1E are connected to a clock line 12 in common.

In FIG. 1, reference numeral 15 is a circuit block of a sampling rate converter. The sampling rate converter 15 has a digital luminance signal input terminal 16, a digital chroma signal input terminal 17, a digital luminance signal output terminal 18, a digital chroma signal output terminal 19, a clock input terminal 20, and a changing clock input terminal 21. The luminance signal input terminal 16 of the sampling rate converter circuit block 15 is connected to the luminance signal bus 10. The chroma signal input terminal 17 of the sampling rate converter circuit block 15 is connected to the chroma signal bus 11. The clock input terminal 20 of the sampling rate converter circuit block 15 is connected to the clock line 12. The sampling rate converter circuit block 15 converts sampling frequencies of digital luminance signals and digital chroma signals supplied through the luminance signal bus 10 and the chroma signal bus 11 into a sampling frequency (of for example 18 MHz that is 1144 $f_H$ in the NTSC system and 1152 $f_H$ in the PAL system) that is in common with all the system.

Figure 4:
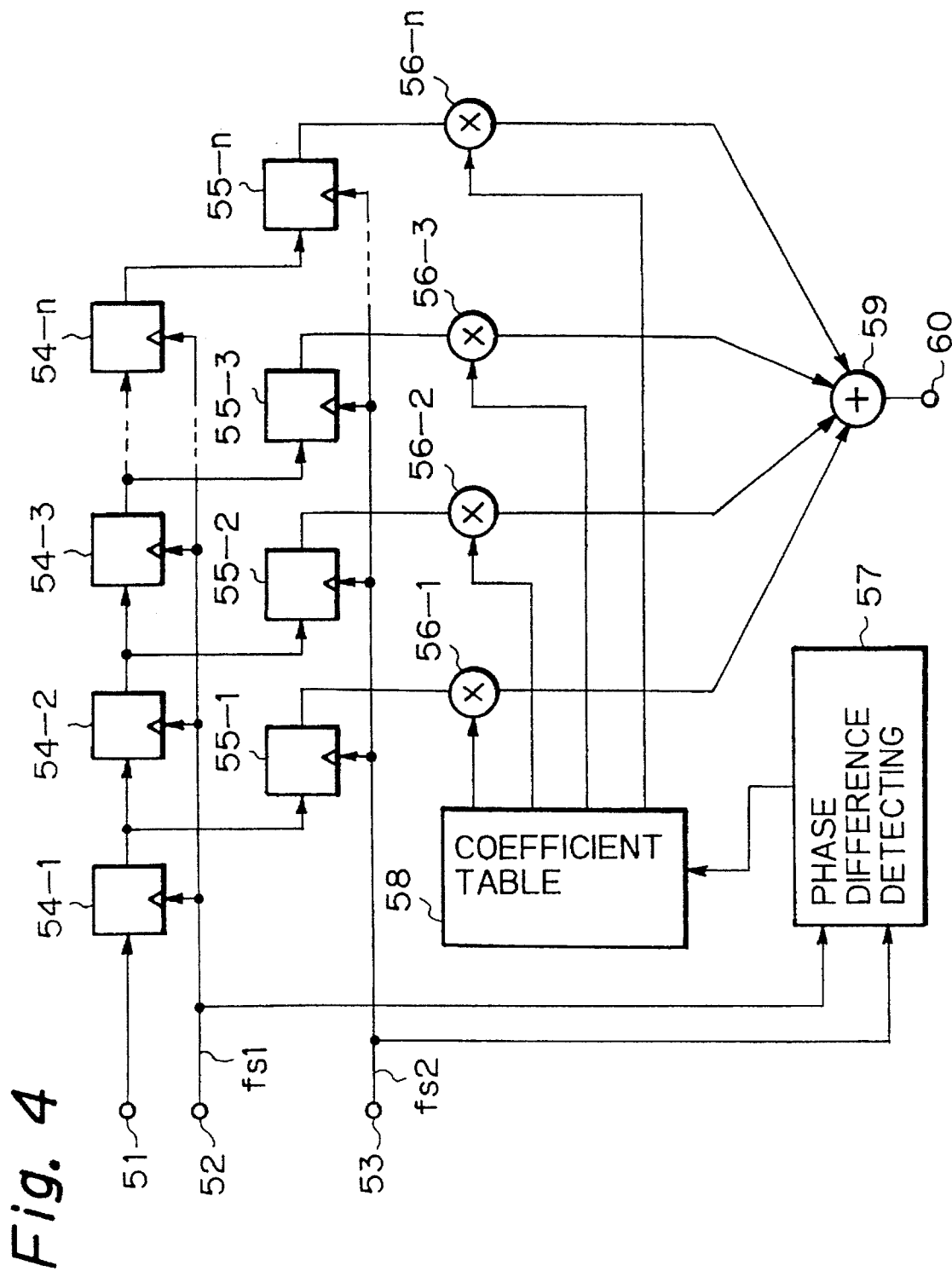
FIG. 4 is a block diagram for explaining a sampling rate converter according to the embodiment of the present invention.

For example, the sampling rate converter circuit block 15 may be constructed as shown in FIG. 4 such as described in Japanese Patent Publication No. 127790/1992. In FIG. 4, reference numeral 51 is a digital signal input terminal. Reference numeral 52 is an input terminal of a sampling clock $f_{s1}$ that has not been converted. Reference numeral 53 is an input terminal of a sampling clock $f_{s2}$ that has been converted. The input terminal 51 corresponds to the luminance signal input terminal 16 or the chroma signal input terminal 17 of the sampling rate converter circuit block 15. In addition, the clock input terminal 52 corresponds to the clock input terminal 20 of the sampling rate converter circuit block 15.

A digital signal with a sampling clock of $f_{s1}$ is supplied from an input terminal 51. The digital signal is sent to registers 54-1, 54-2, ..., 54-n that are connected in series. Outputs between each stage of the registers 54-1 to 54-n have a sampling clock of $f_{s2}$ and are sent to registers 55-1 to 55-n, respectively. The outputs of the registers 55-1 to 55-n are sent to multiplying circuits 56-1, 56-2, ..., 56-n, respectively.

The clocks $f_{s1}$, which is supplied from the input terminal 52, and the clock $f_{s2}$, which is supplied from the input terminal 53, are sent to a phase difference detecting circuit 57. The phase difference detecting circuit 57 detects the phase difference between the pre-converted clock $f_{s1}$ and the post-converted clock $f_{s2}$. The output of the phase difference detecting circuit 57 is sent to a coefficient table 58. The coefficient table 58 generates a coefficient corresponding to the output of the phase difference detecting circuit 57.

The coefficient of the coefficient table is sent to the multiplying circuits 56-1 to 56-n. The multiplying circuits 56-1 to 56-n multiply the outputs of the registers 55-1 to 55-n by the coefficient, respectively. The outputs of the multiplying circuits 56-1 to 56-n are sent to an adding circuit 59. The output of the adding circuit 59 is extracted from an output terminal 60. The output terminal 60 corresponds to the luminance signal output terminal 18 or the chroma signal output terminal 19 of the sampling rate converter circuit block 15.

As shown in FIG. 4, the sampling frequency $f_{s1}$ of the digital signal supplied from the input terminal 51 is changed to the sampling frequency $f_{s2}$ by the registers 55-1 to 55-n. The multiplying circuits 56-1 to 56-n and the adding circuit 59 performs filtering process.

In the construction shown in FIG. 1, to extract the output of a desired circuit block of the circuit blocks 1A to 1E, the output enable signal is sent to only the desired circuit block. The circuit block that has received the output enable signal outputs a luminance signal and a chroma signal. These luminance signal and the chroma signal are sent to the luminance signal bus 10 and the chroma signal bus 11, respectively. The luminance signal and the chroma signal are sent to the sampling rate converter circuit block 15. The sampling clock of the circuit block that has received the output enable signal is sent to the sampling rate converter circuit block 15 through the clock line 12. The sampling rate converter circuit block 15 converts the received sampling rate into a sampling rate that is common in all the systems. The luminance signal and the chroma signal are extracted from output terminals 18 and 19, respectively.

Figure 5:
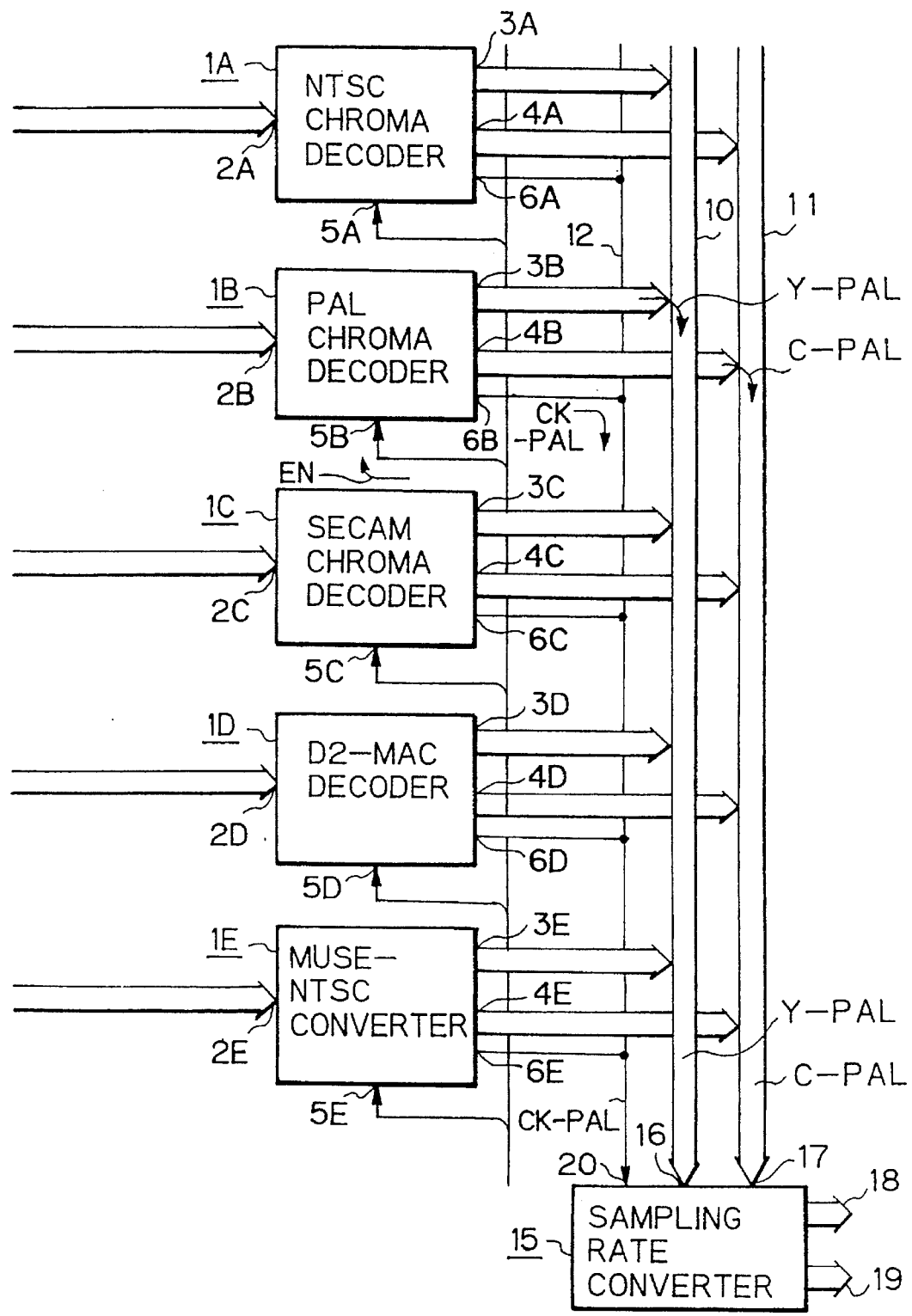
FIG. 5 is a block diagram for explaining the embodiment of the present invention.

When a video signal of for example the PAL system is processed, as shown in FIG. 5, an enable signal EN is sent to only the output enable signal input terminal 5B of the PAL chroma decoder circuit block 1B. Thus, the PAL chroma decoder circuit block 1B outputs a luminance signal Y-PAL and a chroma signal C-PAL that have been decoded. These signals are sent to the sampling rate converter circuit block 15 through the luminance signal bus 10 and the chroma signal bus 11, respectively. In addition, a sampling clock CK-PAL (of for example 17.734475 MHz) is sent from the PAL chroma decoder circuit block 1B to the sampling rate converter circuit block 15 through the clock line 12. The sampling rate converter circuit block 15 converts the sampling frequency of the PAL system into a sampling frequency that is common in all the system (for example, 18 MHz). These luminance signal and chroma signal are extracted from the output terminals 18 and 19, respectively.

Figure 6:
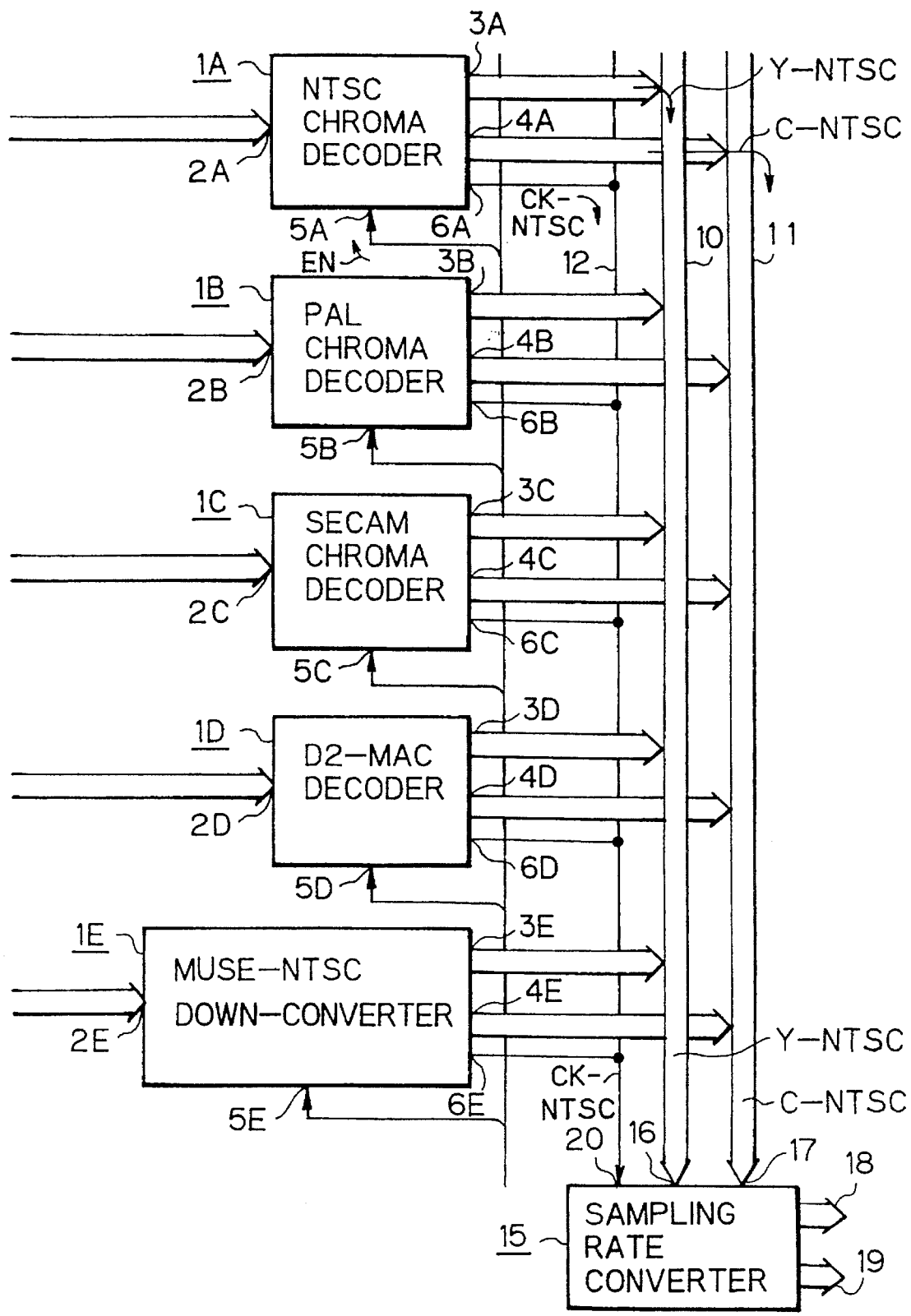
FIG. 6 is a block diagram for explaining the embodiment of the present invention.

When a video signal of for example the NTSC system is processed, as shown in FIG. 6, an enable signal EN is supplied to only the enable signal input terminal 5A of the NTSC chroma decoder 1A. Thus, the NTSC chroma decoder circuit block 1A outputs a luminance signal Y-NTSC and a chroma signal C-NTSC that have been decoded. These signals are sent to the sampling rate converter circuit block 15 through the luminance signal bus 10 and the chroma signal bus 11, respectively. A sampling clock CK-NTSC (of for example 14.31818 MHz) is sent from the NTSC chroma decoder circuit block 1A to the sampling rate converter circuit block 15 through the clock line 12. The sampling rate converter circuit block 15 converts the sampling frequency of the NTSC system into a sampling frequency that is common in all the systems (for example, 18 MHz). The luminance signal and the chroma signal are extracted from the output terminals 18 and 19, respectively.

Thus, according to the present invention, with only the output enable signal sent to a circuit block of a desired system, the output of the circuit block of the desired system is sent to the sampling rate converter circuit block 15. The sampling rate converter circuit block 15 outputs the digital signal with the sampling frequency that is common in all the systems. In addition, since the luminance signal bus 10 and the chroma signal bus 11, which transmit the luminance signal and the chroma signal, respectively, are provided, circuit blocks can be easily added or deleted corresponding to new systems, thereby providing high extensibility.

FIG. 7 shows an example of PinP(picture in picture) signal processing circuit using such a sampling rate converter. A circuit block 31A is a video signal processing circuit for outputting a parent screen corresponding to a sampling rate converter 15 in FIG. 1. Digital luminance signal, digital chroma signal and clock are input to a circuit block 31A as input signals. A circuit block 31 is a PinP signal processing circuit for outputting a child screen. A circuit block 31B is composed with a sampling rate converter in FIG. 1 and interpolating and compensating circuit for generating child screen video signal. A circuit block 31C is a mixing signal processsing circuit for processing signal process to mixed a parents screen video signal and a child screen video signal, such as flicker, sharpness and aspect convertion process. Luminance signal output terminals 32A and 32B of the circuit blocks 31A and 31B are connected to a lminance signal bus 40 in common. Chroma signal output terminals 33A and 33B of the circuit blocks 31A and 31B are connected to a chroma signal bus 41 in common. Clock input terminals 34A and 34B of the circuit blocks 31A and 31B are connected to a clock bus 42 in common. Common clock CK to be changed is supplied to circuit block 31A and 31B through the clock line 42. An output enable signal EN is sent from the circuit block 31B to the circuit block 31A.

Video signals of parents screen, which is input to a circuit block 31A, and video signals of child screen, which is input to a circuit block 31B, are changed to the common frequency CK. The resultant signals are sent to the luminance signal bus 40 and chroma signal bus 41, respectively. For a portion where the parents screen is displayed, the output enable signal EN is supplied from the circuit block 31B to circuit block 31A. For the portion where the child screen is displayed, the output enable signal EN is not supplied. Thus, on the parent screen, the video signal supplied from the circuit block 31A is sent to the circuit block 31C through the luminance signal bus 40 and chroma signal bus 41. On the child screen, the video signal supplied from the circuit block 31B is sent to a circuit block 31C through the luminance signal bus 40 and chroma signal bus 41.

According to the construction, signal process after the sampling rate changing can be treated with one clock CK. When parents screen signal is NTSC and parents screen signal is PAL, same process as above mentioned would be available.

In above mentioned construction, PinP signal processing circuit 31B is composed with two step circuits, which are the sampling rate converter circuit and the compensating and interpolating circuit for processing small picture in FIG. 1, whereas compensating and interpolating process would be done using the changing clock directly.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A sampling rate converting system for converting sampling rate of a digital signal, comprising:

a plurality of circuit blocks for outputting digital signals having different sampling frequencies;

a data bus for commonly connecting output terminals of said circuit blocks; and a sampling rate converter having an input end connected to said data bus and being adapted for receiving a digital signal through said data bus from a selected one of said circuit blocks and for converting the sampling frequency of the received digital signal into a common predetermined sampling frequency which is the same for each of the digital signals received from all of said circuit blocks.

2. The sampling rate converting system as set forth in claim 1, wherein said plurality of said circuit blocks includes at least one of a chroma decoder, a D2-MAC decoder, and a MUSE-NTSC down converter.

3. A sampling rate converting system for converting sampling rate of a digital signal, comprising:

a plurality of circuit blocks for outputting digital signals having different sampling frequencies, each of said circuit blocks having a tri-state buffer at its output stage;

a data bus for commonly connecting output terminals of said circuit blocks; and a sampling rate converter having an input end connected to said data bus and being adapted for converting a sampling frequency of a digital signal received through said data bus into a predetermined sampling frequency.

4. The sampling rate converting system as set forth in claim 3, wherein said system is adapted for causing the tri-state buffer of one of said circuit blocks to be enable state and the other tri-state buffers to be high-impedance state so as to select one of the outputs of said circuit blocks.

5. A sampling rate converting system for converting sampling rate of a digital signal, comprising:

a plurality of circuit blocks for outputting digital signals having different sampling frequencies;

a data bus for commonly connecting output terminals of said circuit blocks;

means for performing a predetermined process using a clock having the same frequency as a changing clock; and a sampling rate converter having an input end connected to said data bus and being adapted for converting a sampling frequency of a digital signal received through said data bus into a common sampling frequency using said changing clock.

6. A video signal processing circuit for mixing a plurality of digital video signals having different sampling frequencies, comprising:

first converting means for converting a first digital video signal into a second digital video signal having a predetermined sampling frequency by using a predetermined clock signal, second converting means for converting a third digital video signal into a fourth digital video signal having said predetermined sampling frequency by using said predetermined clock signal, mixing means for mixing said second digital video signal and said fourth digital video signal using said predetermined clock signal, and means for supplying said predetermined clock signal having said predetermined sampling frequency to said first converting means, said second converting means and said mixing means.

7. A video signal processing circuit for mixing a plurality of digital video signals having different sampling frequencies, comprising:

first converting means for converting a first digital video signal into a second digital video signal with a predetermined sampling frequency using a predetermined clock, second converting means for converting a third digital video signal into a fourth digital video signal with said predetermined sampling frequency using said predetermined clock, mixing means for mixing said second digital video signal and said fourth digital video signal using said predetermined clock, and a data bus being connected to said first converting means and said second converting means in common, and supplying said mixing means with said second digital video signal and said fourth digital video signal.

8. The video signal processing circuit as set forth in claim 7, wherein the output from said first converting means to said data bus is controlled by an enable signal supplied from said second converting means.

* * * * *